United States Patent
Choi et al.

(10) Patent No.: US 11,866,338 B2
(45) Date of Patent: Jan. 9, 2024

(54) ANODE ACTIVE MATERIAL FOR SECONDARY BATTERY, ANODE COMPRISING SAME, AND METHOD FOR MANUFACTURING SAME

(71) Applicant: LG CHEM, LTD., Seoul (KR)

(72) Inventors: Hee Won Choi, Daejeon (KR); Je Young Kim, Daejeon (KR); Sang Wook Woo, Daejeon (KR); Li Lin Piao, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/257,184

(22) PCT Filed: Jan. 17, 2020

(86) PCT No.: PCT/KR2020/000842
§ 371 (c)(1),
(2) Date: Dec. 30, 2020

(87) PCT Pub. No.: WO2020/149688
PCT Pub. Date: Jul. 23, 2020

(65) Prior Publication Data
US 2021/0122639 A1     Apr. 29, 2021

(30) Foreign Application Priority Data
Jan. 17, 2019 (KR) .......................... 10-2019-0006167

(51) Int. Cl.
*C01B 32/205* (2017.01)
*C01B 32/21* (2017.01)

(52) U.S. Cl.
CPC ............ *C01B 32/205* (2017.08); *C01B 32/21* (2017.08); *C01P 2004/32* (2013.01); *C01P 2006/17* (2013.01)

(58) Field of Classification Search
None
See application file for complete search history.

(56) References Cited

U.S. PATENT DOCUMENTS

2007/0166616 A1   7/2007   Kim et al.
2007/0194158 A1   8/2007   Zaghib et al.
(Continued)

FOREIGN PATENT DOCUMENTS

CN   103843179 A   6/2014
CN   105074976 A   11/2015
(Continued)

OTHER PUBLICATIONS

Machine translation of Jinichi, JP H0896797 A (Year: 1996).*
(Continued)

*Primary Examiner* — Coris Fung
*Assistant Examiner* — Keling Zhang
(74) *Attorney, Agent, or Firm* — Birch, Stewart, Kolasch & Birch, LLP (57) ABSTRACT

An anode active material for secondary batteries which has improved cycle swelling characteristics and rapid charge performance, an anode comprising same, and a method for manufacturing same, in which the anode active material is manufactured by modifying the surface of natural graphite particles. The natural graphite particles have a Dmax/Dmin value of 1.6 to 2.1 in the particle size distribution thereof and have, formed in the surface thereof, pores having a diameter of 0.5 μm to 2.0 μm.

6 Claims, 1 Drawing Sheet

(56) References Cited

U.S. PATENT DOCUMENTS

| | | |
|---|---|---|
| 2009/0280413 A1 | 11/2009 | Ohta et al. |
| 2015/0079477 A1 | 3/2015 | Spahr et al. |
| 2016/0056452 A1 | 2/2016 | Tamura et al. |
| 2017/0200950 A1 | 7/2017 | Gulas et al. |

FOREIGN PATENT DOCUMENTS

| | | | |
|---|---|---|---|
| CN | 105794027 A | | 7/2016 |
| CN | 109119627 A | | 1/2019 |
| GB | 2536435 A | | 9/2016 |
| JP | 8-96797 A | | 4/1996 |
| JP | 2003272625 A | * | 9/2003 |
| JP | 2005-97010 A | | 4/2005 |
| JP | 2008-59903 A | | 3/2008 |
| JP | 2010-9951 A | | 1/2010 |
| JP | 2015-517971 A | | 6/2015 |
| JP | 2017-527512 A | | 9/2017 |
| KR | 10-2013-0126842 A | | 11/2013 |
| KR | 10-2014-0128307 A | | 11/2014 |
| KR | 10-1460774 B1 | | 11/2014 |
| KR | 10-2015-0071249 A | | 6/2015 |
| KR | 10-2017-0031201 A | | 3/2017 |
| KR | 10-2017-0039976 A | | 4/2017 |
| KR | 10-2017-0047975 A | | 5/2017 |
| KR | 10-2018-0070302 A | | 6/2018 |
| WO | WO 2014/157630 A1 | | 10/2014 |

OTHER PUBLICATIONS

Machine translation of Katsuya, JP2003272625A (Year: 2003).*
Extended European Search Report for European Application No. 20741910.2, dated Aug. 17, 2021.
International Search Report issued in PCT/KR2020/000842 (PCT/ISA/210), dated May 28, 2020.
Japanese Office Action for corresponding Japanese Application No. 2020-571511, dated May 9, 2022, with English translation.
Indian Office Action for Indian Application No. 202017056268, dated Oct. 25, 2022, with English translation.

* cited by examiner

ANODE ACTIVE MATERIAL FOR SECONDARY BATTERY, ANODE COMPRISING SAME, AND METHOD FOR MANUFACTURING SAME

TECHNICAL FIELD

This application claims the benefit of priority based on Korean Patent Application No. 10-2019-0006167, filed on Jan. 17, 2019, and the entire contents of the Korean patent application are incorporated herein by reference.

The present invention relates to a negative electrode active material for a secondary battery, a negative electrode including the same and a method for manufacturing the same. More specifically, the present invention relates to a negative electrode active material having improved cycle swelling and high rate charging property, a negative electrode, and a method for manufacturing the same.

BACKGROUND ART

The present invention relates to a negative electrode active material for a secondary battery, a negative electrode including the same and a method for manufacturing the same. More specifically, the present invention relates to a negative electrode active material having improved cycle swelling and high rate filling properties, a negative electrode, and a method for manufacturing the same.

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separator is interposed therebetween to thereby make an electrode assembly, which is then mounted in a cylindrical or rectangular metal can or inside a pouch-type case of an aluminum laminate sheet, and a liquid electrolyte is injected or impregnated into the electrode assembly or a solid electrolyte is used to prepare a secondary battery.

Further, secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

Among them, in the case of the negative electrode, in the related art, lithium metal was used as a negative electrode in the secondary battery. However, as the short circuit of the battery due to the formation of dendrites and the risk of explosion caused by this are known, lithium metal is being replaced with a carbon-based compound capable of reversible intercalation and desorption of lithium ions while maintaining structural and electrical properties.

The carbon-based compound has a very low discharge potential of about −3 V to the standard hydrogen electrode potential and exhibits excellent electrode life due to very reversible charge/discharge behavior due to the uniaxial orientation of the graphite layer. In addition, since the electrode potential during Li-ion charging is 0V Li/Li+ and can exhibit a potential almost similar to that of pure lithium metal, it has an advantage that higher energy can be obtained when constructing an oxide positive electrode and a battery.

The carbon-based compound includes crystalline carbon and amorphous carbon. Representative examples of crystalline carbon include graphite carbon such as natural graphite and artificial graphite, and examples of amorphous carbon include non-graphitizable carbons (hard carbons) obtained by carbonizing polymer resins, graphitizable carbons (soft carbons) obtained by heat treatment of pitch, etc.

In particular, as a carbon-based material, natural graphite with high capacity or excellent artificial graphite having high temperature characteristics is used. However, artificial graphite has a lower capacity than natural graphite, has a poor processability such as a decrease in the production of negative electrode slurry and the decrease in electrode adhesion due to secondary granulation and coating treatment, and has low electrode rolling properties. In addition, in the case of natural graphite, the swelling phenomenon according to the high degree of orientation or rapid charging performance is inferior and is not good in the high temperature characteristics due to relatively many functional groups on the surface compared to the artificial graphite.

Korean Patent Registration No. 10-1338299 discloses a lithium secondary battery using natural graphite as a negative electrode active material. However, in the case of a negative electrode active material using natural graphite, the mechanical strength of the electrode is weak, and the cycle swelling and rapid charging performance during charging and discharging are poor. In this case, during charging and discharging, the electrode may swell, resulting in problems such as reduced cycle life.

Therefore, there is a need for technology development for solving the problem.

DISCLOSURE

Technical Problem

The present invention was created to solve the above problems, and object of the present invention is to provide a negative electrode active material for secondary batteries, a negative electrode containing the same and a method for manufacturing the same, in which in a negative electrode active material using natural graphite, particle size distribution is uniformized by removing fine powder and coarse powder, then the surface of the active material is modified through chemical activation by using KOH on the surface, thereby increasing the size of the pores and improving the output of the electrode, rapid charging and cycle swelling performance.

Technical Solution

A negative electrode active material for a secondary battery according to the present invention is a negative electrode active material for a secondary battery comprising natural graphite particles, and wherein the natural graphite particles are surface modified.

In a particle size distribution value of the natural graphite particles, $D_{max}/D_{min}$ may be 1.6 to 2.1, and pores having a diameter of 0.5 μm to 2.0 μm may be formed on the surface of the natural graphite particles.

In addition, in the negative electrode active material for a secondary battery according to the present invention, the pores may be formed by surface modification of the natural graphite particles by treating the surface of the natural graphite particles with potassium hydroxide.

In addition, in the negative electrode active material for a secondary battery according to the present invention, the pores formed on the surface of the natural graphite particles may have a diameter of 0.5 μm to 1.0 μm.

In addition, in the negative electrode active material for a secondary battery according to the present invention, the natural graphite particles may be spherical.

In addition, in the negative electrode active material for a secondary battery according to the present invention, the average particle diameter ($D_{50}$) of the natural graphite particles may be 5 μm to 15 μm.

In addition, in the negative electrode active material for a secondary battery according to the present invention, pores may be formed inside the natural graphite particles.

In addition, in the negative electrode active material for a secondary battery according to the present invention, pores formed inside the natural graphite particles may include 3 vol % to 15 vol % having a diameter of 6 nm or less, and 55 vol % to 85 vol % having a diameter between 60 nm and 200 nm.

In addition, in the negative electrode active material for a secondary battery according to the present invention, the natural graphite particles may be coated with a carbon-based compound.

In addition, in the negative electrode active material for a secondary battery according to the present invention, the natural graphite may be coated with a carbon-based compound.

In addition, the present invention provides a method for manufacturing a negative electrode active material for a secondary battery, including: removing fine powder and coarse powder of natural graphite particles as a classification step, wherein a particle size distribution value, $D_{max}/D_{min}$, is 1.6 to 2.1 for the classified natural graphite particles; and treating the classified natural graphite particles with potassium hydroxide as a surface modification step.

In addition, the method of manufacturing a negative electrode active material for a secondary battery according to the present invention may further include, after the surface modification step, an annealing step of cooling after heating the classified natural graphite particles.

In addition, in the method of manufacturing a negative electrode active material for a secondary battery according to the present invention, in the annealing step, the heat treatment may be performed at 700° C. to 1000° C.

In addition, the method of manufacturing a negative electrode active material for a secondary battery according to the present invention may further include, before the classification step, a step of coating the natural graphite particles with a carbon-based compound.

In addition, the present invention provides a negative electrode including the negative electrode active material for the secondary battery.

Further, the present invention provides a secondary battery comprising a negative electrode, a positive electrode, a separator interposed between the negative electrode and the positive electrode, and an electrolyte.

Advantageous Effects

According to the present invention, in a negative electrode active material using natural graphite, when the active material is manufactured, particle size distribution is uniformized by removing fine powder and coarse powder, then the surface of the active material is modified through chemical activation by using KOH on the surface, thereby increasing the size of the pores and improving the output of the electrode, rapid charging and cycle swelling performance.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

Hereinafter, the present invention will be described in detail.

The negative electrode active material for a secondary battery according to the present invention is manufactured by surface modification of natural graphite, and in the particle size distribution of the natural graphite, the $D_{max}/D_{min}$ value is 1.6 to 2.1.

Generally, as the natural graphite charge/discharge cycle is repeated, a swelling phenomenon may occur due to an electrolyte decomposition reaction occurring at the edge portion of the natural graphite, and charge/discharge efficiency and capacity may decrease. In addition, natural graphite has a large number of internal pores, and when the electrode is rolled, the internal pores are clogged and subject to a lot of mechanical stress. In particular, internal pores in active materials called micro pores are formed during the manufacturing process through spheronization or acid treatment. The pores in the active material have an adverse effect on cell performance by excessive side reaction with the electrolyte.

Therefore, through the surface modification of natural graphite having a small particle size and uniform particle size, the output and rapid charging cycle swelling performance can be improved to the level of artificial graphite or more.

Specifically, in order to improve performance degradation that may occur when using natural graphite, the particle size distribution should be uniform. In the particle size distribution of the natural graphite, the $D_{max}/D_{min}$ value may be 1.6 to 2.1, and preferably 1.8 to 2.0. Here, $D_{max}$ means the diameter of the largest particle in the order of particle diameter, and $D_{min}$ means the diameter of the smallest particle in the order of particle diameter. The smaller the $D_{max}/D_{min}$ value, the sharper the particle size distribution curve.

When the $D_{max}/D_{min}$ value is less than 1.6, rapid charging performance such as inducing lithium precipitation during charging may be deteriorated, and when the $D_{max}/D_{min}$ value exceeds 2.1, it may be difficult to obtain an appropriate density. That is, when the $D_{max}/D_{min}$ is out of the above range, a problem in which the active material tap density becomes too low occurs, and the electrode active material layer becomes thicker and the pressability is lowered, so it becomes difficult to implement high energy density.

In addition, the average particle diameter ($D_{50}$) of the natural graphite may be 5 to 15 μm, more preferably 9 to 11 μm. The average particle diameter ($D_{50}$) means a particle diameter in which the accumulation becomes 50% from the smallest particle in the order of particle diameter. By using natural graphite having an average particle diameter within the above range, it is possible to obtain an advantage of improving the rapid charging ability at a high energy density. When the average particle diameter of the natural graphite exceeds 15 μm, the tap density of the negative electrode and the adhesion property of the active material may decrease, thereby reducing the effect of improving the swelling phenomenon of the electrode. Conversely, if the average particle diameter of natural graphite is less than 5 μm, the initial efficiency of the secondary battery may decrease due to an increase in specific surface area, thereby deteriorating battery performance.

The particle diameter ($D_{max}$, $D_{min}$, $D_{50}$) of the natural graphite can be measured, for example, by using a laser diffraction method. The laser diffraction method can generally measure a particle diameter of several mm from a submicron region, and can obtain results of high reproducibility and high resolution. More specifically, the particle size of the spheroidized natural graphite may be performed as follows. After dispersing the spheroidized natural graphite in a solution of ethanol/water, it may be introduced into a commercially available laser diffraction particle size measuring device (e.g., Microtrac MT 3000) and irradiated with an output power of 60 W of ultrasonic waves of about 28 kHz, and then the particle size of the spheroidized natural graphite may be calculated based on the particle size distribution in the measuring device.

Natural graphite according to an embodiment of the present invention has a specific surface area of 1.7 $m^2$/g to 5.1 $m^2$/g, and the tap density may be 1.0 g/cc to 1.5 g/cc, but is not limited thereto.

Here, the specific surface area is the average specific surface area obtained based on the adsorption isotherm of BET (Brunauer, Emmett, Teller), and it can be measured using BET 6-point method by the nitrogen gas adsorption distribution method by using a porosimetry analyzer (Bell Japan Inc., Belsorp-II mini). Further, the tap density can be measured by performing tapping 2000 times using TAP-2S, manufactured by LOGAN, a tap density meter.

In addition, various types of natural graphite, such as scaly graphite and spherical graphite may be used as natural graphite used as the negative electrode active material of the present invention, and a spherical shape is preferable for improving the compressibility and electrolyte impregnation property for high-rate charge and discharge characteristics of the active material. That is, when the negative electrode active material is manufactured only from natural scale natural graphite, there may be problems such as dropping of the active material from the current collector, bending of the electrode plate, difficulty in controlling the thickness of the electrode plate, low adhesion, and impregnation of the electrolyte.

When natural graphite is spheroidized and used, it can be obtained by applying a mechanical external force to general natural graphite and performing granular spheronization treatment. For example, the spheroidized natural graphite is obtained by treating scaly natural graphite with an acid or a base, and then spheroidizing it for 10 minutes to 30 minutes at a rotor speed of 30 m/s to 100 m/s in a spheroidizing device, but not limited thereto, and in order to adjust the shape and particle size of the natural graphite, the speed of the rotor and the time of the rotor can be appropriately adjusted.

In addition, pores having a diameter of 0.5 to 2.0 μm may be formed on the surface of the natural graphite, and the size of the pores may be more preferably 0.5 to 1.0 μm. The size of the surface pores can be obtained from SEM images of natural graphite particles. Specifically, in an image obtained by scanning microscopy (SEM), pores of about 5% of the total number of pores can be arbitrarily selected to measure their diameter, and the average value of the diameters can be defined as the pore diameter.

As described above, micropores are formed inside the natural graphite through a spheronization and acid treatment process, and unnecessary side reactions may occur between the natural graphite and the electrolyte due to the micropores. Therefore, by forming large pores having a diameter in the above range on the surface of the natural graphite to reduce side reactions between the natural graphite and the electrolyte, the output, rapid charging, and cycle swelling performance of the natural graphite can be improved.

When the size of the pores formed on the surface is less than 0.5 μm, the size of the pores is small, so that side reactions between natural graphite and the electrolyte cannot be suppressed. On the contrary, when the size of the pores exceeds 2.0 μm, the specific surface area of the active material becomes small, and thus, the adhesion between the electrodes may decrease.

The pores formed on the surface may be formed by surface modification by treating the surface of natural graphite with potassium hydroxide (KOH). Potassium hydroxide serves to chemically activate the surface of natural graphite. Specifically, the surface of graphite and potassium hydroxide (KOH) undergo the following reaction.

$$6KOH+2C \rightarrow 2K+3H_2+2K_2CO_3$$

$$K_2CO_3+C \rightarrow K_2O+2CO$$

$$K_2O+C \rightarrow CO+2K$$

As can be seen from the above formula, potassium hydroxide penetrated into the carbon layer forms $K_2O$ during heat treatment at the activation temperature, and the $K_2O$ generated upon activation is reduced back to potassium through a dehydration reaction. As $K_2O$ is reduced, pores are formed on the carbon surface due to carbon loss, and the reduced K penetrates into the inside of the carbon and widens the space inside the carbon.

When the natural graphite is treated with potassium hydroxide (KOH), the potassium hydroxide can penetrate into the natural graphite to chemically activate the natural graphite and increase the size of pores formed inside the natural graphite.

As a result, the pores formed inside the natural graphite may contain 3 to 15 vol %, having a size of 6 nm or less, preferably 5 to 13 vol %, and more preferably 5 to 10 vol %. In addition, the pores formed inside the natural graphite may include 55 to 85 vol % having a size between 60 and 200 nm, preferably 60 to 80 vol %, and more preferably 70 to 80 vol % %. In one embodiment of the present invention, the measurement of the distribution according to the size of the pores formed inside the natural graphite was performed by using BEL Sorption equipment of BEL of Japan, and the nitrogen gas adsorption as a liquid nitrogen temperature was performed to perform BET Plot. The result can be analyzed by BJH method to obtain the total volume of the internal pores and the ratio of the volume occupied by pores having a predetermined diameter (having a size of 6 nm or less and having a size of 60 to 200 nm), respectively.

When the distribution according to the size of the pores formed inside the natural graphite is equal to the above range, the specific surface area is reduced to reduce unnecessary side reactions between the electrolyte and graphite while maintaining the performance of the electrode and the battery, so that the output, rapid charging capacity, and cycle characteristics can be improved.

Inside the natural graphite, if the size of 6 nm or less among the pores formed therein is less than 3 vol %, and the size between 60 and 200 nm exceeds 85 vol %, the specific surface area of the negative electrode active material may be excessively reduced, thereby reducing electrode adhesion and deteriorating cycle characteristics. Conversely, when the size of 6 nm or less exceeds 15 vol %, and the size between 60 and 200 nm is less than 55 vol %, micro pores in the active material may be excessively increased, which is not preferable because side reactions between the electrolyte and the active material may increase.

In addition, the natural graphite may be coated with a carbon-based compound. By coating the natural graphite with a carbon-based compound, the insertion/desorption rate of lithium ions can be increased to confirm improvement in rapid charging performance and output performance.

The carbon-based compound may be amorphous carbon. An amorphous carbon coating layer is formed on the surface of natural graphite to increase the hardness of natural graphite, it is easy to insert/detach lithium during charge/discharge, so there is little change in structure even during repeated charge/discharge, and a stable SEI layer can be formed, thereby improving initial efficiency.

An amorphous carbon coating layer may be formed on each surface of natural graphite according to an embodiment of the present invention by putting carbon source and natural graphite in a kiln and heat-treating them, for example, for about 3 hours to about 15 hours in a temperature range of 300° C. to 1400° C.

The carbon source can be used without limitation, as long as it generates carbon by heat treatment. For example, coating may be performed by pyrolysis carbon using at least one gaseous or liquid carbon source selected from the group consisting of methane, ethane, ethylene, butane, acetylene, carbon monoxide, propane, polyvinyl alcohol and propylene. Alternatively, the coating may be performed by liquid or solid pitch. Alternatively, any one or a mixture of two phases selected from the group consisting of glucose, fructose, galactose, maltose, lactose, sucrose, phenolic resin, naphthalene resin, polyvinyl alcohol resin, urethane resin, polyimide resin, furan resin, cellulose resin, epoxy resin, polystyrene resin, resorcinol-based resin, fluoroglucinol-based resin, tar and low molecular weight heavy oil, etc. may be a carbon source. Herein, the pitch may be a coal-based pitch or a petroleum-based pitch.

The coating amount of amorphous carbon on the natural graphite may be 0.5 parts to 10 parts by weight, preferably 1 part to 8 parts by weight, and more preferably 2 to 7 parts by weight based on 100 parts by weight of natural graphite. If the coating amount of the amorphous carbon is less than 0.5 parts by weight, the hardness of natural graphite is lowered, and side reaction with the electrolyte may increase. Conversely, when the coating amount of the amorphous carbon exceeds 10 parts by weight, the thickness of the amorphous carbon layer is excessively increased, so that mobility of lithium ions may decrease and resistance may increase, and the surface may become hard, so that the electrode density cannot be increased.

The present invention also provides a negative electrode for a secondary battery containing the negative electrode active material.

The negative electrode may be prepared by applying a negative electrode mixture containing a negative electrode active material on a current collector and drying it, and the negative electrode mixture may optionally further include a binder, a conductive material, and a filling material, if necessary. At this time, as the negative electrode active material, the surface-modified natural graphite may be used.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The conductive material is usually added in an amount of 1 to 30% by weight based on the total weight of the mixture including the negative electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and thermal black; conductive fibers such as carbon fiber and metal fiber; carbon fluoride; metal powders such as aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the negative electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The present invention also provides a secondary battery produced by the method. Specifically, the secondary battery includes at least two secondary battery electrodes manufactured by the present invention and has a structure in which the electrode assembly is embedded in the battery case, wherein the electrode assembly is wound with a separator interposed between the secondary battery electrodes and has a structure in which the electrode assembly is impregnated with a lithium salt-containing non-aqueous electrolyte. The electrode for the secondary battery may be a positive electrode and/or a negative electrode. At this time, the negative electrode described above may be used, and the negative electrode may be manufactured as a lithium secondary battery after being assembled as an electrode assembly and sealed in a battery case together with an electrolyte, followed by an activation process. The secondary battery may be a cylindrical battery, a prismatic battery, a pouch-type battery, or a coin-type battery, and the shape of the battery is not particularly limited.

The electrode assembly is not particularly limited as long as it has a structure made of a positive electrode and a negative electrode and a separator interposed therebetween, for example, a folding structure, or a stacked structure, or a stack/folding type (SNF) structure, or lamination/stack-type (LNS) structure.

The folding-type electrode assembly includes at least one positive electrode, at least one negative electrode, and at least one separator interposed between the positive electrode and the negative electrode and the positive electrode, the separator, and the negative electrode may have a structure in which one end and the other end do not cross each other.

Further, the stack-type electrode assembly includes at least one positive electrode, at least one negative electrode, and at least one separator interposed between the positive electrode and the negative electrode and the positive electrode, the separator, and the negative electrode may have a structure in which one end and the other end cross each other.

The stack/folding-type electrode assembly includes at least one positive electrode, at least one negative electrode, and at least one separator interposed between the positive electrode and the negative electrode, and the separator includes a first separator and a second separator. Further, the positive electrode, the first separator, and the negative electrode may have a structure in which one end and the other end do not cross each other. The second separator may have a structure surrounding an electrode side on which an electrode tab is not formed.

The electrode assembly of the lamination-stack structure may include one or more improved electrodes having a laminate laminated on one or both surfaces thereof. The improved electrode, for example, may be implemented in a structure in which the separator is bonded to one surface of the positive electrode or the negative electrode. In addition, the separator may be implemented in a structure that is bonded to both sides of the positive electrode or both sides of the negative electrode. In addition, the positive electrode, the separator and the negative electrode may be implemented in a structure that is bonded to each other in a state where the separator is interposed between the positive electrode and the negative electrode.

In the secondary battery according to the present invention, the positive electrode may be prepared by applying an electrode mixture containing a positive electrode active material on a current collector and drying it, and the positive electrode mixture may optionally further include a binder, a conductive material, a filler, and the like, if necessary.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or CO; olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

In the positive electrode, additive materials such as a binder, a conductive material, and a filling material are as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, a polyalginate lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, lithium imide and the like.

For the purpose of improving charge/discharge characteristics, flame retardancy, etc., pyridine, triethylphosphite, triethanolamine, cyclic ether, ethylenediamine, n-glyme, hexa methyl phosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

In addition, the present invention provides a method for manufacturing the negative electrode active material.

Figure 1:
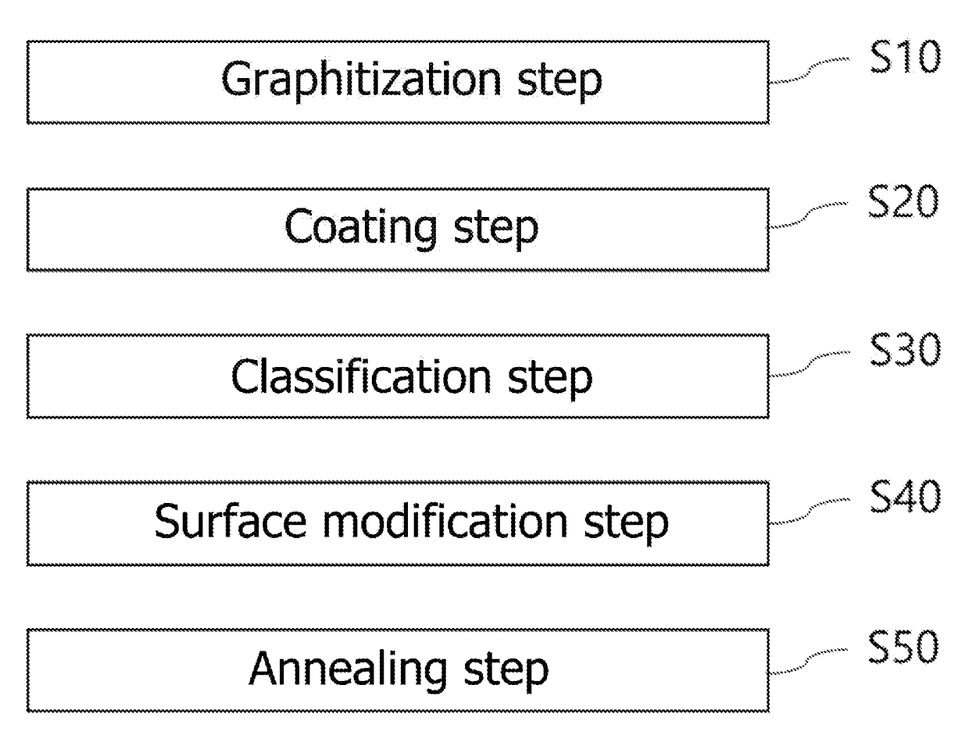
The Figure is a flowchart showing the flow of a method for manufacturing a negative electrode active material according an embodiment of the present invention.

The Figure is a flowchart showing the flow of a method for manufacturing a negative electrode active material according to the present invention.

Referring to The Figure, the method of manufacturing the negative electrode active material may include: a classifying step of removing fine powder and coarse powder so that the $D_{max}/D_{min}$ value becomes 1.6 to 2.1 for natural graphite; and a surface modification step of treating the classified natural graphite with potassium hydroxide (KOH).

The natural graphite in the classification step may be natural graphite obtained by graphitizing natural graphite having a constant shape after pulverization treatment. The pulverized natural graphite undergoes a graphitization process at a high temperature. By heating the natural graphite at a high temperature, functional groups present on the surface of the natural graphite can be removed, and side reaction with the electrolyte at high temperature can be suppressed.

The graphitization step may be performed at 2800 to 3200° C., preferably 2900 to 3100° C., more preferably about 3000° C. When the temperature is less than 2800° C., the temperature is low and the graphitization step may not be sufficiently performed, so that the surface functional group may not be removed. On the other hand, when the temperature exceeds 3200° C., natural graphite may be damaged through thermal decomposition or the like, which is not preferable.

In addition, the graphitization step may be performed for 8 to 12 hours, preferably 9 to 11 hours. If the time for performing the graphitization step is less than 8 hours, the graphitization step may not be sufficiently performed and the surface functional groups may not be removed, and if it exceeds 12 hours, there is a problem such as an increase in process cost.

In one embodiment of the present invention, prior to the classifying step of removing fine powder and coarse powder, a coating step of coating the graphitized natural graphite with a carbon-based compound may be performed. The coating step is a step of coating a carbon-based compound such as amorphous carbon on the natural graphite on the surface of the natural graphite, and the coating step is performed to increase the hardness of natural graphite and allow easy insertion/detachment of lithium during charging/discharging, thereby reducing structural changes even during repeated charge/discharge and increasing initial efficiency by forming a stable SEI layer.

After the graphitization step, the natural graphite may be adjusted to have a $D_{max}/D_{min}$ value of 1.6 to 2.1, preferably 1.8 to 2.0, by going through a classification step.

The classification process may be carried out by any method, but it is appropriate to perform it by an air flow classification process. In the case of performing the air flow classification process, the conditions of the air flow classification process can be appropriately adjusted according to the type of the active material.

The classified natural graphite may be subjected to a surface modification step of treating potassium hydroxide (KOH). As described above, potassium hydroxide chemically activates the surface of natural graphite to form large pores having a diameter of 0.5 to 2.0 μm, preferably 0.5 to 1.0 μm, on the surface of natural graphite to cause reduction of side reactions between natural graphite and electrolyte. As such, the output, rapid charge and cycle swelling performance of natural graphite can be improved.

Specifically, the graphite was mixed in a potassium hydroxide solution, left to stand at a constant temperature, and dried. Thereafter, in order to remove the remaining potassium ions and potassium hydroxide, the graphite may be treated with an acidic solution and then washed with distilled water.

In addition, the method of manufacturing a negative electrode active material according to the present invention may further include an annealing step (S50) of heating and cooling natural graphite after the surface modification step.

Specifically, the annealing step may be a process of heat-treating the surface-modified natural graphite at 700 to 1000° C., preferably 800 to 900° C. for 2 to 12 hours, and gradually cooling again. In addition, the annealing step may be performed in an inert gas and mixed gas atmosphere. Herein, the inert gas may be one or more selected from the group consisting of argon, nitrogen, and helium.

When the annealing temperature is less than 700° C., the annealing effect is not large, and when the temperature exceeds 1000° C., the temperature becomes too high, and the surface structure of graphite may be destroyed.

Through the annealing step, impurities that may be included as a by-product in natural graphite may be removed, and the mechanical properties of graphite may be improved by stabilizing the pore structure activated by KOH.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

Preparation of Negative Electrode

Spherical natural graphite (specific surface area: 2.5 m²/g, tap density: 1.21 g/cc) graphitized by heating at 3000° C. for 10 hours was prepared. Subsequently, the petroleum-based pitch and the natural graphite were mixed in a weight ratio of 5:95, placed in a calcination furnace, and heat treated for 8 hours at a temperature of about 1200° C. to coat natural graphite with amorphous carbon. At this time, the amorphous carbon coating layer was about 4% by weight relative to the entire coated natural graphite particles, and the average particle diameter ($D_{50}$) of the coated natural graphite particles was about 12 μm.

The natural graphite was classified to remove fines and coarse powders so that the $D_{max}/D_{min}$ value was 1.8. Thereafter, the natural graphite was mixed with a 1M potassium hydroxide solution and left at 1400° C. for 6 hours, followed by surface treatment, and then the surface-treated natural graphite was washed. Subsequently, an annealing process of heat-treating the natural graphite at 900° C. for 8 hours and then cooling it slowly was performed. As a result, an active material made of natural graphite was prepared, in which the $D_{max}/D_{min}$ value was 1.8, and pores with a diameter of 0.5 μm were formed on the surface (the pore diameter was measured in the SEM image of natural graphite particle, and since the diameter of the pores was almost uniform, 10 pores were arbitrarily selected, and the average value of the diameters of the selected pores were 0.5 μm), and 10 vol % of pores having a size of 6 nm or less and 70 vol % of pores having a size of 60 to 200 nm were formed inside.

The natural graphite used as a negative electrode active material, SuperC65 used as a conductive material, styrene butadiene rubber (SBR) used as a binder, and carboxymethylcellulose (CMC) used as a thickener were mixed at a weight ratio of 96.6:1:1.3:1.1, respectively, and water was added to prepare a slurry.

The slurry prepared as described above was applied to a copper foil, and a negative electrode having an area of 1.4875 cm² in vacuum drying at about 130° C. for 10 hours was prepared. At this time, the loading of the negative electrode was prepared to be 3.61 mAh/cm².

Preparation of Battery Cells

A negative electrode was prepared by applying the negative electrode active material to the copper foil so that the loading amount is 3.61 mAh/cm². As the counter electrode (positive electrode), a lithium transition metal composite oxide using NCM622 was used so that the loading amount becomes 3.2561 mAh/cm². An electrode assembly was manufactured by interposing a polyethylene separator between the working electrode and the counter electrode. Then, 1M LiPF$_6$ was added to a solvent in which 0.5 wt % of the non-aqueous electrolyte additive VC was added, which was generated by mixing ethylene carbonate (EC) with diethylene carbonate (DEC) in a volume ratio of 1:4, to thereby prepare a non-aqueous electrolyte solution, which was then injected into the electrode assembly. The electrode assembly was put in a case to produce a coin-type full-cell secondary battery.

In addition, the negative electrode active material was coated on a copper foil to prepare a working electrode (negative electrode) so that the loading amount was 3.61 mAh/cm² in an area of 1.4875 cm², and lithium metal having an area of 1.7671 cm² was used as a counter electrode (positive electrode). An electrode assembly was manufactured by interposing a polyethylene separator between the working electrode and the counter electrode. Then, 1M LiPF$_6$ was added to a solvent in which 0.5 wt % of the non-aqueous electrolyte additive VC was added, which was generated by mixing ethylene carbonate (EC) with diethylene carbonate (DEC) in a volume ratio of 1:4, to thereby prepare a non-aqueous electrolyte solution, which was then injected into the electrode assembly. The electrode assembly was put in a case to produce a coin-type half-cell secondary battery.

Example 2

Preparation of Negative Electrode

Graphite heat treatment was performed and amorphous carbon were coated on the spherical natural graphite in the same manner as in Example 1 to prepare natural graphite having an average particle diameter ($D_{50}$) of about 12 μm and a ratio of the amorphous carbon coating layer of about 4% by weight. Fine powder and coarse powder were removed by classifying the natural graphite. Subsequently, the natural graphite was surface treated with KOH in the same manner as in Example 1, and an annealing process was performed. As a result, an active material made of natural graphite was prepared, in which the $D_{max}/D_{min}$ value was 1.8, pores having a size of 1 μm were formed on the surface, and 5 vol % of pores having a size of 6 nm or less and 80 vol % of pores having a size of 60 to 200 nm were formed therein.

The natural graphite used as a negative electrode active material, SuperC65 used as a conductive material, styrene butadiene rubber (SBR) used as a binder, and carboxymethylcellulose (CMC) used as a thickener were mixed at a weight ratio of 96.6:1:1.3:1.1, respectively, and water was added to prepare a slurry.

The slurry prepared as described above was applied to a copper foil, and a negative electrode having an area of 1.4875 cm$^2$ in vacuum drying at about 130° C. for 10 hours was prepared. At this time, the loading of the negative electrode was prepared to be 3.61 mAh/cm$^2$.

Preparation of Battery Cells

The negative electrode active material of Example 2 was used to prepare a battery (coin type full cell and half-cell battery) in the same manner as in Example 1.

Example 3

Graphite heat treatment was performed and amorphous carbon were coated on the spherical natural graphite in the same manner as in Example 1 to prepare natural graphite having an average particle diameter ($D_{50}$) of about 12 μm and a ratio of the amorphous carbon coating layer of about 4% by weight. Fine powder and coarse powder were removed by classifying the natural graphite. Subsequently, the natural graphite was surface treated with KOH in the same manner as in Example 1, but an annealing process was not performed. As a result, a negative electrode active material made of natural graphite was prepared, in which the $D_{max}/D_{min}$ value was 2.0, pores having a size of 1 μm were formed on the surface, and 15 vol % of pores having a size of 6 nm or less and 60 vol % of pores having a size of 60 to 200 nm were formed therein.

Further, the negative electrode active material was used to prepare a battery (coin type full cell and half-cell battery) in the same manner as in Example 1.

Example 4

Graphite heat treatment was performed and amorphous carbon were coated on the spherical natural graphite in the same manner as in Example 1 to prepare natural graphite having an average particle diameter ($D_{50}$) of about 12 μm and a ratio of the amorphous carbon coating layer of about 4% by weight. Fine powder and coarse powder were removed by classifying the natural graphite. Subsequently, the natural graphite was surface treated with KOH in the same manner as in Example 1, but an annealing process was not performed. As a result, a negative electrode active material made of natural graphite was prepared, in which the $D_{max}/D_{min}$ value was 2.0, pores having a size of 2 μm were formed on the surface, and 10 vol % of pores having a size of 6 nm or less and 70 vol % of pores having a size of 60 to 200 nm were formed therein.

Further, the negative electrode active material was used to prepare a battery (coin type full cell and half-cell battery) in the same manner as in Example 1.

Comparative Example 1

Graphite heat treatment was performed and amorphous carbon were coated on the spherical natural graphite in the same manner as in Example 1 to prepare natural graphite having an average particle diameter ($D_{50}$) of about 12 μm and a ratio of the amorphous carbon coating layer of about 4% by weight. Thereafter, the natural graphite was not classified, and the surface of the natural graphite was surface treated with KOH, but an annealing process was not performed. As a result, a negative electrode active material made of natural graphite was prepared, in which the $D_{max}/D_{min}$ value was 2.2, pores having a size of 1 μm were formed on the surface, and 15 vol % of pores having a size of 6 nm or less and 60 vol % of pores having a size of 60 to 200 nm were formed therein.

Further, the negative electrode active material was used to prepare a battery (coin type full cell and half-cell battery) in the same manner as in Example 1.

Comparative Example 2

Graphite heat treatment was performed and amorphous carbon were coated on the spherical natural graphite in the same manner as in Example 1 to prepare natural graphite having an average particle diameter ($D_{50}$) of about 12 μm and a ratio of the amorphous carbon coating layer of about 4% by weight. Although the fine powder and the coarse powder were removed through the classification of the natural graphite, the surface of the natural graphite was not treated with KOH, and an annealing process was not performed. As a result, a negative electrode active material made of natural graphite was prepared, in which the $D_{max}/D_{min}$ value was 2.0, pores were not formed on the surface, and 20 vol % of pores having a size of 6 nm or less and 50 vol % of pores having a size of 60 to 200 nm were formed therein.

Further, the negative electrode active material was used to prepare a battery (coin type full cell and half-cell battery) in the same manner as in Example 1.

Comparative Example 3

Graphite heat treatment was performed and amorphous carbon were coated on the spherical natural graphite in the same manner as in Example 1 to prepare natural graphite having an average particle diameter ($D_{50}$) of about 12 μm and a ratio of the amorphous carbon coating layer of about 4% by weight. The natural graphite was not classified, the surface of natural graphite was not treated with KOH, and an annealing process was not performed. As a result, a negative electrode active material made of natural graphite was prepared, in which the $D_{max}/D_{min}$ value was 2.2, pores were not formed on the surface, and 25 vol % of pores having a size of 6 nm or less and 40 vol % of pores having a size of 60 to 200 nm were formed therein.

Further, the negative electrode active material was used to prepare a battery (coin type full cell and half-cell battery) in the same manner as in Example 1.

Comparative Example 4

Natural graphite having an average particle diameter ($D_{50}$) of about 12 μm was obtained by heating at 3000° C. for 5 hours. Subsequently, the amorphous graphite was not coated on the natural graphite, and fine powder and coarse powder were removed through classification, and then surface treatment with KOH was performed in the same manner as in Example 1, but an annealing process was not performed. As a result, a negative electrode active material made of natural graphite was prepared, in which the $D_{max}/D_{min}$ value was 2.0, pores having a size of 2 μm were formed on the surface, and 30 vol % of pores having a size of 6 nm or less and 50 vol % of pores having a size of 60 to 200 nm were formed therein.

Further, the negative electrode active material was used to prepare a battery (coin type full cell and half-cell battery) in the same manner as in Example 1.

Comparative Example 5

Natural graphite having an average particle diameter ($D_{50}$) of about 12 μm was obtained by heating at 3000° C. for 5 hours. Thereafter, the natural graphite was not coated with amorphous carbon, and without classification, the natural graphite was surface treated with KOH in the same manner as in Example 1, but an annealing process was not performed. As a result, a negative electrode active material made of natural graphite was prepared, in which the $D_{max}/D_{min}$ value was 2.2, pores having a size of 2 μm were formed on the surface, and 35 vol % of pores having a size of 6 nm or less and 40 vol % of pores having a size of 60 to 200 nm were formed therein.

Further, the negative electrode active material was used to prepare a battery (coin type full cell and half-cell battery) in the same manner as in Example 1.

Comparative Example 6

Graphite heat treatment was performed and amorphous carbon were coated on the spherical natural graphite in the same manner as in Example 1 to prepare natural graphite having an average particle diameter ($D_{50}$) of about 12 μm and a ratio of the amorphous carbon coating layer of about 4% by weight. Fine powder and coarse powder were removed so that the $D_{max}/D_{min}$ value became 1.4 through classification of the natural graphite, and then the natural graphite was surface treated with KOH in the same manner as in Example 1. As a result, a negative electrode active material made of natural graphite was prepared, in which pores having a size of 0.5 μm were formed on the surface, and 10 vol % of pores having a size of 6 nm or less and 70 vol % of pores having a size of 60 to 200 nm were formed therein.

Further, the negative electrode active material was used to prepare a battery (coin type full cell and half-cell battery) in the same manner as in Example 1.

Table 1 below summarizes the properties of each negative electrode active material prepared by the Examples and Comparative Examples.

[Experimental Example 1] Monocell HPPC Output 2.5C@SOC 50 TEST

After charging the monocell type lithium secondary battery so that the SOC value was 50%, the output resistance at room temperature (25° C.) was measured according to the HPPC (Hybrid pulse power characterization) test method. Specifically, the lithium secondary battery was charged/discharged for 3 cycles at the condition of 2.5V discharge and 4.2V charge at 0.33C, then the battery was discharged to SOC 50%, then charged at 2.5C for 10 minutes, then rested for 30 minutes, then discharged at 2.5C for 10 minutes, then rested for 30 minutes again. At this time, the resistance value was obtained by dividing the voltage change during charge/discharge by the applied current to thereby indicate HPPC resistance value.

[Experimental Example 2] Li-Plating Test

The half-cell was charged and discharged at 1C for 3 cycles by using the prepared coin-type half-cell, and then charged at 3C for 15 minutes to first differentiate the profile. At this time, the inflection point appearing in dQ/dV was checked to quantify lithium plating SOC (Li-Plating SOC, %), which is the SOC at the time of lithium precipitation on the negative electrode surface. The results are shown in Table 2.

[Experimental Example 3] In-Situ SAC Swelling Test

The charging range was determined to allow SOC to become from 0 to 95% by using the manufactured coin-type full cell, and the change in the thickness of the negative electrode during charging and discharging was expressed as a swelling ratio (%) while charging the first cycle at 0.1C, the second cycle at 0.2C, and the third to 30th cycles at 0.5C. The results are shown in Table 2.

TABLE 1

|  | $D_{max}/D_{min}$ | Surface pore size (μm) | Whether KOH treatment was performed | Whether annealing was performed | Pores of 6 nm or less (vol %) | Pores of 60-200 nm (vol %) |
|---|---|---|---|---|---|---|
| Example 1 | 1.8 | 0.5 | ○ | ○ | 10 | 70 |
| Example 2 | 1.8 | 1.0 | ○ | ○ | 5 | 80 |
| Example 3 | 2.0 | 1.0 | ○ | X | 15 | 60 |
| Example 4 | 2.0 | 2.0 | ○ | X | 10 | 70 |
| Comparative Example 1 | 2.2 | 1.0 | ○ | X | 15 | 60 |
| Comparative Example 2 | 2.0 | X | X | X | 20 | 50 |
| Comparative Example 3 | 2.2 | X | X | X | 25 | 40 |
| Comparative Example 4 | 2.0 | 2.0 | ○ | X | 30 | 50 |

TABLE 1-continued

|  | $D_{max}/D_{min}$ | Surface pore size (μm) | Whether KOH treatment was performed | Whether annealing was performed | Pores of 6 nm or less (vol %) | Pores of 60-200 nm (vol %) |
|---|---|---|---|---|---|---|
| Comparative Example 5 | 2.2 | 2.0 | ○ | X | 35 | 40 |
| Comparative Example 6 | 1.4 | 0.5 | ○ | X | 10 | 70 |

TABLE 2

|  | HPPC resistance (ohm) | Li-Plating SOC (%) | Swelling Ratio (%) |
|---|---|---|---|
| Example 1 | 0.62 | 50 | 22.0 |
| Example 2 | 0.63 | 48 | 21.8 |
| Example 3 | 0.65 | 47 | 22.3 |
| Example 4 | 0.68 | 45 | 22.9 |
| Comparative Example 1 | 0.89 | 38 | 27.5 |
| Comparative Example 2 | 0.94 | 34 | 29.2 |
| Comparative Example 3 | 1.01 | 35 | 30.8 |
| Comparative Example 4 | 1.14 | 29 | 31.5 |
| Comparative Example 5 | 1.06 | 26 | 33.7 |
| Comparative Example 6 | 1.11 | 27 | 33.5 |

As can be seen in Table 2, in Examples 1 to 4, the particle size distribution is uniform and pores are formed on the surface, and a large number of pores having a particle size of 60 to 200 nm are also formed inside. As a result, it can be seen that the output characteristics and the cycle swelling characteristics of the battery were improved compared to Comparative Examples 1, 3, and 5 in which the particle size distribution was not uniform.

In addition, in Examples 1 to 4, the output characteristics and cycle swelling characteristics of the battery were improved compared to Comparative Examples 2 and 3 in which no pores were formed on the surface, and the output characteristics and the cycle swelling characteristics of the battery were improved compared to Comparative Examples 2 to 5 in which the size distribution of pores formed therein was outside the numerical range of the present invention.

On the other hand, when comparing Example 1, in which $D_{max}/D_{min}$ value is 1.8 with Comparative Example 6, in which $D_{max}/D_{min}$ value is 1.4, it can be seen that when the value of $D_{max}/D_{min}$ is less than 1.6 and the content of the coarse powder is relatively low, it may have a negative effect on the output characteristics and cycle swelling characteristics of the battery.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain the protection scope of the present invention and should be interpreted by the claims below, and it should be interpreted that all technical spirits within the equivalent scope are included in the scope of the present invention.

The invention claimed is:

1. A negative electrode active material for a secondary battery comprising:
   natural graphite particles,
   wherein the natural graphite particles are surface modified,
   wherein the natural graphite particles are spherical,
   wherein a particle size distribution value of the natural graphite particles, $D_{max}/D_{min}$, is 1.8 to 2.0, and
   wherein pores having a diameter of 0.5 μm to 2.0 μm are formed on a surface of the natural graphite particles,
   wherein the pores are fomred inside the natural graphite particles, and
   wherein the pores formed inside the natural graphite particles comprise 5 vol % to 15 vol % having a diamter of 6 nm or less, and 60 vol % to 80 vol % having a diameter between 60 nm and 200 nm.

2. The negative electrode active material of claim 1, wherein the pores are formed by surface modification of the natural graphite particles by treating the surface of the natural graphite particles with potassium hydroxide.

3. The negative electrode active material of claim 1, wherein the pores formed on the surface of the natural graphite particles have a diameter of 0.5 μm to 1.0 μm.

4. The negative electrode active material of claim 1, wherein an average particle diameter ($D_{50}$) of the natural graphite particles is 5 μm to 15 μm.

5. The negative electrode active material of claim 1, wherein pores are formed inside the natural graphite particles.

6. The negative electrode active material of claim 5, wherein the carbon-based compound is amorphous carbon.

* * * * *